Patented Oct. 30, 1928.

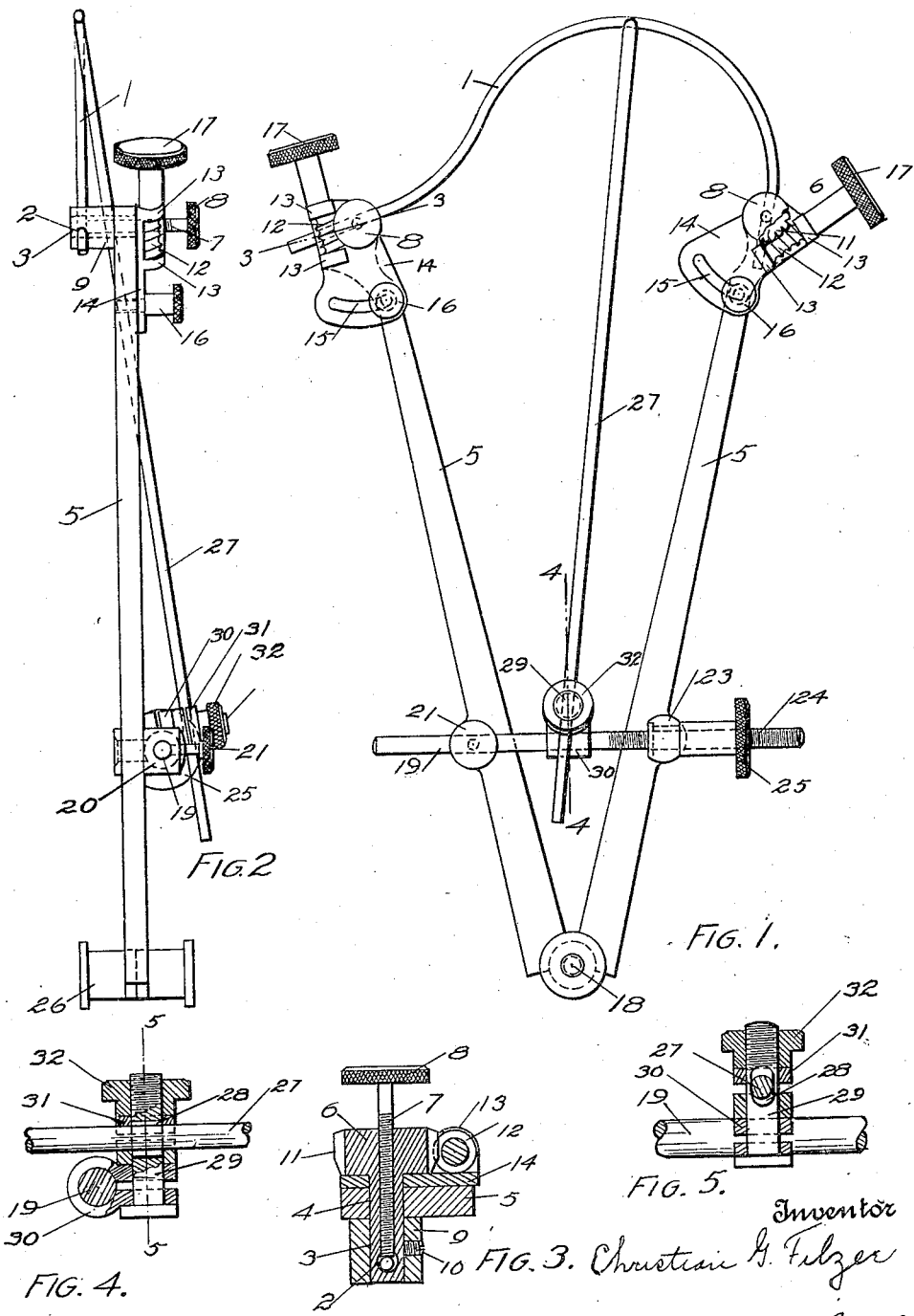

1,689,234

UNITED STATES PATENT OFFICE.

CHRISTIAN G. FILZER, OF ERIE, PENNSYLVANIA, ASSIGNOR OF ONE-HALF TO HERMAN STEINRUCK, OF ERIE, PENNSYLVANIA.

VARIABLE CURVE-FORMING DEVICE.

Application filed April 20, 1925. Serial No. 24,403.

This invention is designed to form irregular curves of varying form and is intended to enable a draftsman to shape an irregular curve and use the curve so formed in drafting, or otherwise. Other details and features of the invention will appear from the specification and claims.

The invention is illustrated in the accompanying drawings as follows:—

Fig. 1 shows a front elevation.
Fig. 2 a side elevation.
Fig. 3 a section on the line 3—3 in Fig. 1.
Fig. 4 a section on the line 4—4 in Fig. 1.
Fig. 5 a section on the line 5—5 in Fig. 4.

1 marks the curve element which is formed of flexible wire, preferably a resilient wire. This element 1 is threaded through openings 2 in pivotal blocks 3. These blocks extend through openings 4 in the ends of arms 5. The upper ends of the blocks have heads 6 and the screw threaded stems 7 extend into the blocks and are adapted to lock the variable element 1 in any position that it may be adjusted through the opening, thus varying the length of the element. The screw in each mounting is provided with a head 8 by means of which the element is locked in the pivotal block. A collar 9 is arranged on the bottom end of each pivotal block and is secured by a set screw 10.

Each pivotal block is also provided with a worm gear 11 and this is actuated by a worm 12. The worm 12 is mounted in bearings 13 arranged on a plate 14. The plate 14 has a slot 15 through which a screw 16 extends for locking the plate in any position to which it may be swung. A handle 17 is arranged on the worm by means of which it may be operated. The purpose of swinging the plate 14 is to so place the worm and handle 17 as not to interfere with the use of the curve element.

The arms 5 are pivoted at 18 and it will be noted that the mountings are similar on each arm.

The arms may be spread or brought together, thus increasing the length or reducing the length of the lement. An adjusting rod 19 extends through a block 20 and is locked by an adjusting screw 21. The rod extends through a block 23 and is screwthreaded at 24 receiving a nut 25 by means of which a nice adjustment of the arm is provided.

In order to hold the pivot end of the arms 5 at the same level as the forward ends a support 26 is arranged at the pivot, the lower end of the support being in the same plane as the lower end of the block 3.

In operation, the element 1 is bent by swinging its mounting to varying curves, practically any curve being possible through such mounting especially with the means for adjusting the distance between the mountings. Further the element is slidingly adjusted in the mounting and can be locked giving different lengths with the same distance between the mounting, thus affording a variation in the curve.

In order to brace or support the curve element 1 it is sometimes desirable to form a backing intermediate its ends. I accomplish this in the present invention by means of a rod 27 which is adapted to engage the back of the element. This rod extends through a slot 28 in a bolt 29. The bolt extends through a split block 30 swivelled on the pin 19. A collar 31 is arranged over the rod 27 and a nut 32 screwed on the bolt. It will readily be seen that by clamping the nut, the split block is clamped on the rod and the rod is clamped against the block so as to prevent it swinging sidewise and the whole support is locked. Thus the rod may be adjusted to any point in the element that it may be desired to strengthen.

What I claim as new is:—

1. In a variable curve forming device, the combination of a flexible curve forming element; pivotal mountings in which the element is slidingly mounted; screws for locking the element in the pivotal mountings; worm gears on the pivotal mountings; worms for actuating the gears; pivoted arms on which the mountings are pivotally mounted and the worms journalled; and means for adjusting the arms to vary the distance between the pivots of the mountings.

2. In a variable curve forming device, the combination of a resilient curve forming element; mountings for the element; pivotally connected arms on which the mountings are pivotally mounted; a screw adjusting the arms for varying the distance between the pivots of the mountings; and a screw on the arms adjusting the mountings pivotally on the arms.

In testimony whereof I have hereunto set my hand.

CHRISTIAN G. FILZER.